2,791,610
Patented May 7, 1957

2,791,610
PREPARATION OF SUCCINAMIDE

Everett Joseph Frazza, Stamford, and Richard Lansing Webb, Darien, Conn., assignors to American Cyanamid Company, New York, N. Y., a corporation of Maine No Drawing. Application December 15, 1955,
Serial No. 553,197

1 Claim. (Cl. 260—561)

This invention relates to succinamide. More particularly, it relates to an improved method of preparing succinamide.

Succinamide has shown potential value in various fields particularly as an intermediate in the preparation of other products. For instance, it has found use in the preparation of resinous compositions, being reacted with polyethylenemelamines as described in U. S. Patent No. 2,582,594. The methylol derivative of succinamide obtained by reacting it with formaldehyde has been found to be an excellent crease-proofing agent for cotton. Many other potential uses of succinamide exist. Accordingly, much interest has been shown in improved methods of preparing succinamide.

Succinamide has heretofore been prepared by a procedure employed for the preparation of amides in general. This procedure comprises hydrating succinonitrile using sulfuric acid monohydrate at a temperature of about 90–110° C. or higher. On completion of the reaction, the reaction product comprising succinamide may be neutralized with aqueuos ammonia or the like. The product may then be separated by any conventional means such as filtration. This procedure, however, has not been particularly successful. Optimum yields obtained have not been greater than about 50–60% of theory. This is particularly surprising in view of the high yields obtained when hydrating other nitriles, for instance, acrylonitrile, with sulfuric acid monohydrate at elevated temperatures.

It has now been discovered, in accordance with this invention, that the above-described procedure can be modified so as to increase substantially the yield of succinonitrile. Surprisingly, this increase in yield is obtained by conducting the reaction within a temperature range lower than that previously employed and heretofore considered inadequate. In general, then the process of this invention comprises reacting succinonitrile and sulfuric acid monohydrate at a temperature of about 70–80° C., neutralizing resultant succinamide sulfate and separating succinamide.

Other conditions being optimum, yields of succinamide as high as 90–92.5% have been obtained by conducting the hydration of succinonitrile at a temperature of about 70–80° C. in accordance with this invention. Why such a substantial increase in yield is obtained by operating within this temperature range is not fully understood nor is there any intention of restricting the process of this invention by any particular theory of operation. It is believed, however, that it is in part due to a decrease in by-product succinimide formation. The result is quite surprising and unexpected considering that highest yields of other amides generally are obtained at higher temperatures, and in view of the fact that elevated temperatures are usually favorable to such reactions. Temperatures below about 70° C. may be employed, but the time required to obtain a high yield of product is considerably longer.

The reactants, succinonitrile and sulfuric acid monohydrate, may be used in stoichiometrically equivalent amounts, i. e., one mol of succinonitrile to two mols of sulfuric acid monohydrate. Best results, however, are obtained by using the sulfuric acid in slight excess. It has been found according to this invention that optimum results are obtained using the succinonitrile and sulfuric acid in a mol ratio of 1:2.2. The amount of water employed for the hydrolysis may be considerably varied but will usually be in a mol ratio to the succinonitrile of about 1–2:1. The order of addition when conducting the process batchwise may be varied. Preferably, however, succinonitrile is gradually added to a solution of acid in water. This gives an inherently more stable system than does the reverse addition of acid to a mixture of the nitrile and water. The process may also be readily conducted in a continuous manner in which event the feed rates are so adjusted as to give the desired reactant ratio.

Yield of succinonitrile is also influenced by the reaction time after addition of reactants is complete. Optimum yield is obtained employing relatively short reaction periods of less than about 90 minutes. For batch operation, a period of about 15–40 minutes has been found optimum, while for continuous operation a period of about 45–75 minutes is preferred. Longer periods result in correspondingly lower yields of succinonitrile.

On completion of the reaction, the reaction mixture is cooled and may then be added to a solution of ammonia in water to neutralize the succinamide sulfate. The precipitated product is then separated as by filtration, washed and dried.

The following examples further illustrate the process of this invention. All parts are by weight unless otherwise noted.

Example 1

A stirred solution of 223.2 parts of sulfuric acid and 39.6 parts of water is heated to 70° C. and 80 parts of succinonitrile added over a period of 12 minutes. The temperature is maintained at 70–75° C., with ice bath cooling during the addition and for an additional 25 minutes thereafter using an oil bath. The reaction mixture is then poured with cooling into a stirred solution of 135 parts of concentrated ammonium hydroxide in 800 parts of water. The precipitate is filtered, slurried with 200 parts of water, refiltered and dried. Yield: 106.2 parts (91.6%) of white crystalline succinamide.

The surprising improvement in yield of succinonitrile obtained by the present process as demonstrated by Example 1 is further illustrated by the following example in which a higher reaction temperature according to the prior art is employed.

Example 2

To a mixture of 196 parts of sulfuric acid and 36 parts of water is added 80 parts of succinonitrile over a period of 20 minutes. The temperature is maintained in the range of 90–100° C. during the addition and for 40 minutes thereafter. The viscous solution is then poured with cooling into 245 parts of concentrated ammonium hydroxide in 500 parts of water. The precipitate is filtered, washed with water and dried. Yield: 59 parts (51%) of white crystalline succinamide.

We claim:

A method of preparing succinamide which comprises: hydrating succinonitrile with sulfuric acid at a temperature of 70°–80° C., the nitrile and acid being in a mol ratio of about 1:2.2, maintaining the temperature after the reactants are brought together for a period of about 15–90 minutes, neutralizing resultant succinamide sulfate and separating succinamide.

References Cited in the file of this patent

UNITED STATES PATENTS 1,581,621    Trusler _____ Apr. 20, 1926

FOREIGN PATENTS 730,518    Germany _____ Jan. 28, 1943